United States Patent
Ukai et al.

(10) Patent No.: US 7,395,370 B2
(45) Date of Patent: Jul. 1, 2008

(54) COMPUTER SYSTEM, DATA MANAGEMENT METHOD, AND PROGRAM FOR DETERMINING A MIGRATION METHOD BASED ON PREDICTION OF A MIGRATION INFLUENCE

(75) Inventors: Toshiyuki Ukai, Machida (JP); Yoshifumi Takamoto, Kokubunji (JP); Masaaki Shimizu, Mitaka (JP); Yoshiko Yasuda, Tokorozawa (JP)

(73) Assignee: Hitachi, Ltd., Tokyo (JP)

( * ) Notice: Subject to any disclaimer, the term of this patent is extended or adjusted under 35 U.S.C. 154(b) by 313 days.

(21) Appl. No.: 11/244,038

(22) Filed: Oct. 6, 2005

(65) Prior Publication Data
US 2006/0218367 A1 Sep. 28, 2006

(30) Foreign Application Priority Data
Mar. 24, 2005 (JP) .............................. 2005-085250

(51) Int. Cl.
G06F 12/00 (2006.01)
(52) U.S. Cl. ...................................... 711/114; 711/162
(58) Field of Classification Search .................. None
See application file for complete search history.

(56) References Cited

U.S. PATENT DOCUMENTS

| | | | |
|---|---|---|---|
| 5,742,792 A * | 4/1998 | Yanai et al. | 711/162 |
| 5,956,750 A | 9/1999 | Yamamoto et al. | |
| 6,173,377 B1 * | 1/2001 | Yanai et al. | 711/162 |
| 6,502,205 B1 * | 12/2002 | Yanai et al. | 714/7 |
| 6,701,449 B1 * | 3/2004 | Davis et al. | 714/4 |
| 7,055,059 B2 * | 5/2006 | Yanai et al. | 714/7 |
| 7,240,238 B2 * | 7/2007 | Yanai et al. | 714/7 |
| 7,277,821 B2 * | 10/2007 | Ochi et al. | 702/182 |
| 2002/0152305 A1 * | 10/2002 | Jackson et al. | 709/224 |
| 2003/0167151 A1 * | 9/2003 | Ding et al. | 702/186 |
| 2004/0073831 A1 * | 4/2004 | Yanai et al. | 714/7 |
| 2006/0005074 A1 * | 1/2006 | Yanai et al. | 714/5 |
| 2006/0085166 A1 * | 4/2006 | Ochi et al. | 702/186 |

FOREIGN PATENT DOCUMENTS

JP 09-274544 10/1997

OTHER PUBLICATIONS

"IPStor® Solution Overview" by FalconStor Software Japan, 2004.
"Data Sheet EMC DiskXtender Unix/Linux" EMC Corp. 2004.
"Hitachi Freedom Storage™ Lightning 9900™ V Series Performance Monitor (Performance Management) User's Guide," issued by Hitachi Data Systems Corporation, 2002., pp. 1-76.

(Continued)

Primary Examiner—Kevin Verbrugge
(74) Attorney, Agent, or Firm—Mattingly, Stanger, Malur & Brundidge, P.C.

(57) ABSTRACT

A technology capable of achieving the LU migration in terms of a file system and a logical volume and the effective migration in a host computer which provides a file system function and a logical volume function is provided. A computer system has I/O access unification and management means that obtains RAID configuration information and RAID statistical information in a disk array system and manages an I/O access unified management table in which file system configuration information and logical volume configuration information managed by an OS are unified. Also, the computer system has migration volume deciding means that determines a migration method based on the I/O access unified management table, migration influence predicting means that obtains migration influence prediction information, and RAID linkage migration performing means.

20 Claims, 14 Drawing Sheets

OTHER PUBLICATIONS

"Hitachi Freedom Storage™ Lightning 9900™ V Series Hitachi CruiseControl™ User's Guide", Hitachi Data Systems Corp. 2002., pp. 1-58.

"Hitachi Freedom Storage™ Lightning 9900™ V Series ShadowImage User's Guide",Hitachi Data Systems Corporation, 2002. pp. 1-70.

* cited by examiner

FIG. 3

| NUMBER | INDIVIDUAL ID (301) | TYPE/ MODLE (302) | ACCESS MEANS TO SVP (303) | OBTAINABLE INFORMATION (304) | | | CAPABILITY OF MIGRATION (305) |
|---|---|---|---|---|---|---|---|
| | | | | RAID CONFIGURATION | RAID STATISTICS | MIGRATION INFLUENCE PREDICTION | |
| 1 | CID1 | RAID_A xxx | ... | OBTAINABLE | OBTAINABLE | OBTAINABLE | CAPABLE |
| 2 | CID2 | RAID_A xxx | ... | OBTAINABLE | OBTAINABLE | OBTAINABLE | CAPABLE |
| 3 | CID3 | RAID_C | ... | OBTAINABLE | NOT OBTAINABLE | NOT OBTAINABLE | CAPABLE |

FIG. 4

| 401 | 402 | 403 | 404 | 405 | UTILIZATION RATIO | | LU CONFIGURATION INFORMATION | | | | |
|---|---|---|---|---|---|---|---|---|---|---|---|
| FS | LV | LU | INDIVIDUAL ID | LU ID | AVERAGE | MAXIMUM | CAPACITY | PG ID | RAID LEVEL | CONFIGURATION | ... |
| FS1 | LV1 | LU1 1 | CID1 | LID1 | 5% | 20% | 100GB | PID1 | 1 | 2D+2D | ... |
| | | LU1 2 | CID1 | LID2 | 5% | 20% | 100GB | PID2 | 1 | 2D+2D | ... |
| | LV2 | LU1 3 | CID1 | LID3 | 30% | 70% | 100GB | PID1 | 1 | 2D+2D | ... |
| | | LU1 4 | CID1 | LID4 | 40% | 80% | 100GB | PID2 | 1 | 2D+2D | ... |
| | LV3 | LU1 5 | CID1 | LID5 | 2% | 10% | 200GB | PID5 | 5 | 3D+1P | ... |
| | - | LU1 6 | CID1 | LID6 | 0% | 0% | 100GB | PID6 | 1+0 | (2D+2D) X2 | ... |
| - | - | - | CID1 | LID6 | 0% | 0% | 100GB | PID7 | 1+0 | (2D+2D) X2 | ... |
| - | - | LU2 1 | CID2 | LID1 | 0% | 0% | 100GB | PID7 | 1+0 | (2D+2D) X2 | ... |
| - | - | - | .. | .. | .. | .. | .. | .. | .. | .. | .. |

406 — UTILIZATION RATIO; 407 — LU CONFIGURATION INFORMATION

EXAMPLE OF INTERNAL CONFIGURATION OF DISK ARRAY SYSTEM

EXAMPLE OF TYPE-BY-TYPE DETAILED INFORMATION TABLE

| # | DKA ID | CORRESPONDING PG ID |
|---|--------|---------------------|
| 1 | DKA1   | PID1, PID3, PID5, PID7 |
| 2 | DKA2   | PID2, PID4, PID6, PID8 |
| 3 | DKA3   | PID1, PID3, PID5, PID7 |
| 4 | DKA4   | PID2, PID4, PID6, PID8 |

COMPUTER SYSTEM, DATA MANAGEMENT METHOD, AND PROGRAM FOR DETERMINING A MIGRATION METHOD BASED ON PREDICTION OF A MIGRATION INFLUENCE

CROSS-REFERENCE TO RELATED APPLICATION

The present application claims priority from Japanese Patent Application No. JP 2005-85250 filed on Mar. 24, 2005, the content of which is hereby incorporated by reference into this application.

TECHNICAL FIELD OF THE INVENTION

The present invention relates to a computer system which provides a file system and a logical volume. More particularly, it relates to a technology effectively applied to a file system management method and program for changing the configuration of the file system.

BACKGROUND OF THE INVENTION

For example, in many computer systems, an access from a user program or the like to a secondary storage is performed through a plurality of abstraction and virtualization layers by software and hardware. With these abstraction and virtualization, convenience of an access to a volume of the secondary storage is enhanced. Typical abstraction and virtual layers are a file system and a logical volume provided by an OS.

The file system provides abstract means such as input and output to/from a file, which makes it unnecessary for the user program to directly manage the information about data storage locations in a volume of the secondary storage (for example, to specify a disk block number, the number of blocks, and others).

Also, the logical volume is a virtual volume newly defined from a set of one or more physical volumes (volume group). The logical volume allows abstraction of a volume to be used as a file system and management of the virtual storage separated from the physical volume.

Using a logical volume allows flexible volume management in a computer system. For example, in a logical volume, a plurality of disk devices can be unified and used as a single volume. Conversely, one large volume can be used as a plurality of small volumes. Also, if no space is available in a file system, a physical volume can be added to a volume group to increase the capacity of the logical volume. A file system is constructed on one or more logical volumes created in the above-described manner.

Note that the above-described physical volume is a volume that is physical when viewed from a host. In a storage system typified by a disk array system, by unifying and managing actual physical storage devices in its inside, those storage devices are shown as logical storage devices without showing the internal physical configuration to the host side. Therefore, in the following, physical volumes shown on the host side are referred to as logical storage units (hereinafter referred to as LUs).

On the other hand, as shown in "IPStor® SOLUTION OVERVIEW" issued by FalconStor Japan, 2004 (Non-patent document 1) and "Data Sheet EMC DiskXtender UNIX(registered trademark)/Linux", EMC corporation (Non-patent document 2), there are some products in which storage devices of different types and different vendors are bundled into one storage device pool and provided as a volume of an arbitrary size or a Network Attached Storage (NAS). These products also include a control technology in which a host defines the secondary storages with different processing speeds and different storage capacities by hierarchy as storage spaces of virtual storage devices, and depending on the frequency of access from the host, data is migrated to storage devices with relatively high processing speed and those with relatively low processing speed.

Furthermore, Japanese Patent Laid-Open Publication No. 9-274544 (Patent document 1) discloses a system in which a plurality of LUs with different processing speeds and different storage capacities are configured in a storage system typified by a disk array system used in connection with a computer. This patent document 1 discloses a technology for the storage system in which the frequency of access from the computer to data stored in the storage devices is managed as statistical information, and based on this statistical information, an LU having a high frequency of access is moved (migrated) to a physical storage device of higher performance.

"Hitachi Freedom Storage (registered trademark) Lightning 9900 (registered trademark) V Series Performance Monitor (Performance Management) User's Guide," issued by Hitachi Data Systems Corporation, 2002 (Non-patent document 3) discloses a method in which configuration information and statistical information in a disk array system is extracted via a service processor connected to the disk array system. "Hitachi Freedom Storage (registered trademark) Lightning 9900 (registered trademark) V Series Hitachi CruiseControl (registered trademark) User's Guide," issued by Hitachi Data Systems Corporation, 2002 (Non-patent document 4) discloses an interface using a technology in which an LU having a high frequency of access is migrated to a physical storage device of higher performance based on the statistical information.

"Hitachi Freedom Storage (registered trademark) Lightning 9900 (registered trademark) V Series ShadowImage User's Guide," issued by Hitachi Data Systems Corporation, 2002 (Non-patent document 5) discloses an interface using a technology in which a copy of an LU is created in a disk array system or among disk array systems.

SUMMARY OF THE INVENTION

Incidentally, the above-described conventional technologies have the problems as follows. First, in a host computer which provides a file system function and a logical volume function, LU migration in terms of the file system and the logical volume is difficult. This is because the characteristic of the physical storage device which forms the LU to be used cannot be accurately known.

In the above-described non-patent documents 1, depending on whether the LUs operate at high speed or low speed, the LUs can be classified by devices and, if they are of different types, by unique IDs for the respective types into high-speed disk devices, intermediate-speed disk devices, and low-speed tape devices, for example. However, in the disk array system as disclosed in the patent document 1, a plurality of LUs having different processing speeds and different storage capacities can be configured in the same system, which makes it difficult to classify these LUs depending on their operation speeds. For this reason, for example, if the speed of a logical volume is desired to be increased, a system administrator has to take steps of grasping the LUs configuring the logical volume, studying the configuration of physical storage devices in the LU, and migrating the LUs to a physical storage device of a higher speed.

In the above-described patent document 1, since the storage system side can know only the configuration of the LUs and the physical storage devices inside the storage system, LU migration in terms of the file system and the logical volume is impossible.

The second problem is that, when the LU migration in terms of the file system and the logical volume is desired, it is difficult to predict an influence on the system after migration.

In the above-described non-patent documents 1 and 2, since the host side cannot know the configuration of the physical storage devices of the LUs, migration of an LU in a storage system may cause the interference of a physical storage device of a migration destination with a physical storage device of another LU, and thus the migration adversely affects the performance.

In the above-described patent document 1, similar to the first problem, since the storage system side can know only the configuration of the LUs and the physical storage devices in the storage system, LU migration in terms of the file system and the logical volume is impossible.

Therefore, a first object of the present invention is to provide a technology that allows LU migration in terms of a file system and a logical volume in a host computer which provides a file system function and a logical volume function.

Also, a second object of the present invention is to provide a technology that allows effective migration by determining a migration method based on highly-accurate prediction of a migration influence.

The above and other objects and novel characteristics of the present invention will be apparent from the description of this specification and the accompanying drawings.

The typical ones of the inventions disclosed in this application will be briefly described as follows.

(1) The present invention is applied to a computer system formed of one or more computers (host computers) and one or more secondary storages (disk array systems), a data management method in this computer system, and further a program executing this data management method, and it has the characteristics described below.

That is, the computer system comprises: first means (file system program, logical volume manager) which unifies the secondary storages and manages the unified secondary storages as a virtual storage device; second means (I/O access unification and management means) which obtains configuration information of physical storage devices forming the secondary storages; third means (I/O access unification and management means) which obtains performance statistical information collected in the secondary storages; and a table (I/O access unified management table) which relates the virtual storage device and the performance statistical information collected in the secondary storages.

Furthermore, the table has a threshold for first information included in the performance statistical information, and the computer system further comprises: fourth means (migration volume deciding means, migration influence predicting means, RAID linkage migration performing means) which decides whether the secondary storage used as the virtual storage device is changed from a first secondary storage unified into the virtual storage device to a second secondary storage not unified into the virtual storage device when the first information exceeds the threshold.

(2) The present invention is applied to a computer system formed of one or more computers (host computers), one or more secondary storages (disk array systems) and a computer (SVP) for managing the secondary storages which is communicable with the secondary storages, a data management method in this computer system, and further a program executing this data management method, and it has the characteristics described below.

That is, the computer system comprises: first means (file system program, logical volume manager) which unifies the secondary storages and manages the unified secondary storages as a virtual storage device; and second means (I/O access unification and management means) which obtains configuration information of physical storage devices forming the secondary storages. The computer for managing the secondary storages includes third means (I/O access unification and management means) which obtains performance statistical information of the secondary storages and a table (I/O access unified management table) which relates the virtual storage device and the performance statistical information of the secondary storages.

Furthermore, the table has a threshold for first information included in the performance statistical information, and the computer system further comprises: fourth means (migration volume deciding means, migration influence predicting means, RAID linkage migration performing means) which decides whether the secondary storage used as the virtual storage device is changed from a first secondary storage unified into the virtual storage device to a second secondary storage not unified into the virtual storage device when the first information exceeds the threshold.

(3) The present invention is applied to a computer system formed of one or more computers (host computers), one or more secondary storages (disk array systems) and a computer (SVP) for managing the secondary storages which is communicable with the secondary storages, a data management method in this computer system, and further a program executing this data management method, and it has the characteristics described below.

That is, the computer system comprises: first means (file system program, logical volume manager) which unifies the secondary storages and manages the unified secondary storages as a virtual storage device. In the case where a mirror in which a first secondary storage and a second secondary storage have same contents can be formed as the virtual storage device and the secondary storages and the computer for managing the secondary storages have a function of data copying among the secondary storages, the computer system further comprises: second means (I/O access unification and management means) which decides, by using a table (I/O access unified management table) which relates the virtual storage device and the secondary storages, whether the function of data copying among the secondary storages can be used for synchronization of the contents of the first and second secondary storages to form the mirror between the first and second secondary storages.

The computer system further comprises: third means (RAID linkage LV mirror synchronizing means) which instructs the secondary storages and the computer for managing the secondary storages to perform the function of data copying among the secondary storages when it is decided that the function of data copying among the secondary storages can be used for synchronization of the contents of the first and second secondary storages.

The effect obtained by the representative one of the inventions disclosed in this application will be briefly described as follows.

According to the present invention, in the host computer which provides a file system function and a logical volume function, LU migration in terms of a file system and a logical volume can be performed.

Also, according to the present invention, effective migration is possible by determining a migration method based on highly-accurate prediction of a migration influence.

BRIEF DESCRIPTIONS OF THE DRAWINGS

FIG. 3 is an illustrative drawing of an individual information management table in the first embodiment of the present invention;

FIG. 4 is an illustrative drawing of an I/O access unified management table in the first embodiment of the present invention;

DESCRIPTIONS OF THE PREFERRED EMBODIMENTS

Hereinafter, embodiments of the present invention will be described in detail with reference to the accompanying drawings. Note that components having the same function are denoted by the same reference symbols throughout the drawings for describing the embodiment, and the repetitive description thereof will be omitted.

(Concept of the Invention)

The present invention is characterized by having I/O access unification and management means that obtains RAID configuration information and RAID statistical information in a disk array system (Redundant Arrays of Inexpensive Disks: RAID) and manages an I/O access unified management table in which file system configuration information and logical volume configuration information managed by an OS are unified. The present invention is also characterized by having migration volume deciding means that determines a migration method based on the I/O access unified management table, migration influence predicting means that obtains migration influence prediction information of the disk array system, and RAID linkage migration performing means.

First Embodiment

Figure 1:
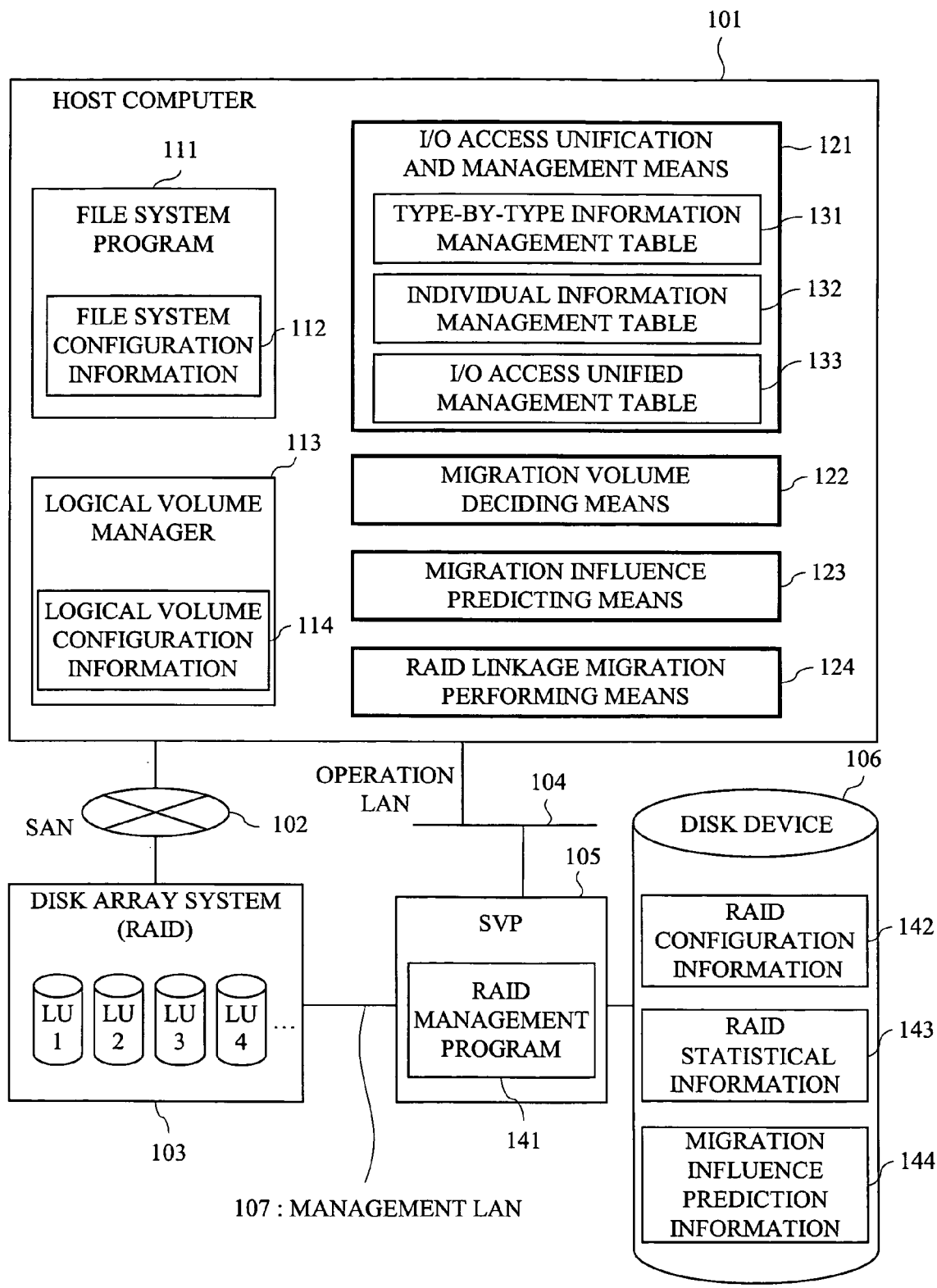
FIG. 1 is a schematic drawing of the structure of a computer system according to a first embodiment of the present invention.

FIG. 1 is a schematic drawing of the structure of a computer system according to a first embodiment of the present invention. The computer system according to the present embodiment typically includes a host computer 101, a disk array system 103, a Service Processor (SVP) 105, and a disk device 106.

The host computer 101 and the disk array system 103 are connected to each other via a Storage Area Network (SAN) 102, which is a network for storage. To the disk array system 103, the SVP 105 for disk management is connected via a management-purpose Local Area Network (management LAN) 107. To the SVP 105, the disk device 106 used to store various information outputted by a RAID management program 141 operating on the SVP 105 is connected.

The information outputted by the RAID management program 141 typically includes RAID configuration information 142, RAID statistical information 143, and migration influence prediction information 144. The RAID configuration information 142 is information about configuration of LUs, which will be described later. The RAID statistical information 143 and the migration influence prediction information 144 are performance statistical information and information about influences when LU migration is performed, respectively, which are typified by the example shown in the above-described non-patent document 4.

In the disk array system 103, by changing the internal configuration of physical storage devices, a plurality of LUs having different processing speeds and storage capacities are configured. Variations in the configuration of the physical storage devices are determined depending on the RAID level, the number of constituent physical storage devices, and the like.

The RAID level represents a data disposing method in a disk array system, and its details are described in "A Case for Redundant Arrays of Inexpensive Disks (RAID)", written by Patterson and two others, Proceedings of the 1988 ACM SIGMOD conference, pp. 109-116.

For example, in RAID 1, at least two disk devices are provided, each retaining the same contents to form a mirror. In RAID 5, on the other hand, one or more physical storage devices storing a data stripe in which data of a file accessed from a host computer is stored and one or more disks storing a parity stripe for use in recovering the data stored in the data stripe are provided. Note that, in RAID 5, in order to represent the configuration of the physical storage devices, a representation such as "3D+1P" is used. "3D+1P" indicates that this RAID 5 is formed of three data stripes and one parity stripe.

Hereinafter, the number of data stripes and the number of parity stripes in the LUs forming a RAID 5 configuration are represented in a manner similar to that described above. Similarly, in RAID 1, in order to represent the configuration of its physical storage devices, a representation such as "2D+2D" is used. "2D+2D" indicates that a total of four disk devices are used and each two of them form a mirror. Furthermore, each group of physical storage devices forming "3D+1P" or "2D+2D" is hereinafter referred to as a parity group (PG).

By dividing or combining physical storage spaces provided by PGs, the LUs are provided in a form reconfigured as logical storage spaces in the disk array system 103.

Read/Write (I/O) of data to an LU from an application program in the host computer 101 is performed not by directly specifying the LU but via a logical volume or a file system. The logical volume is formed of one or more LUs, and the file system is formed of one or more logical volumes. A logical volume manager 113 includes logical volume configuration information 114 in which a correspondence between the LUs and the logical volumes is described. A file system program 111 includes file system configuration information 112 in which a correspondence between the file systems and the logical volumes is described.

The host computer 101 can communicate with the SVP 105 via an operation-purpose LAN (operation LAN) 104 and can obtain information managed by the RAID management program 141.

In the present embodiment, by adding I/O access unification and management means 121, migration volume deciding means 122, migration influence predicting means 123, and RAID linkage migration performing means 124 to a program operating on the host computer 101, a function to allow the LU migration in terms of the file system and the logical volume is provided.

Also, the I/O access unification and management means 121 retains a type-by-type information management table 131 for describing a feature of each type and model of the disk array system 103, an individual information management table 132 for describing a feature of each individual disk array system 103 to be connected, and an I/O access unified management table 133, which will be described later in detail.

Figure 2:
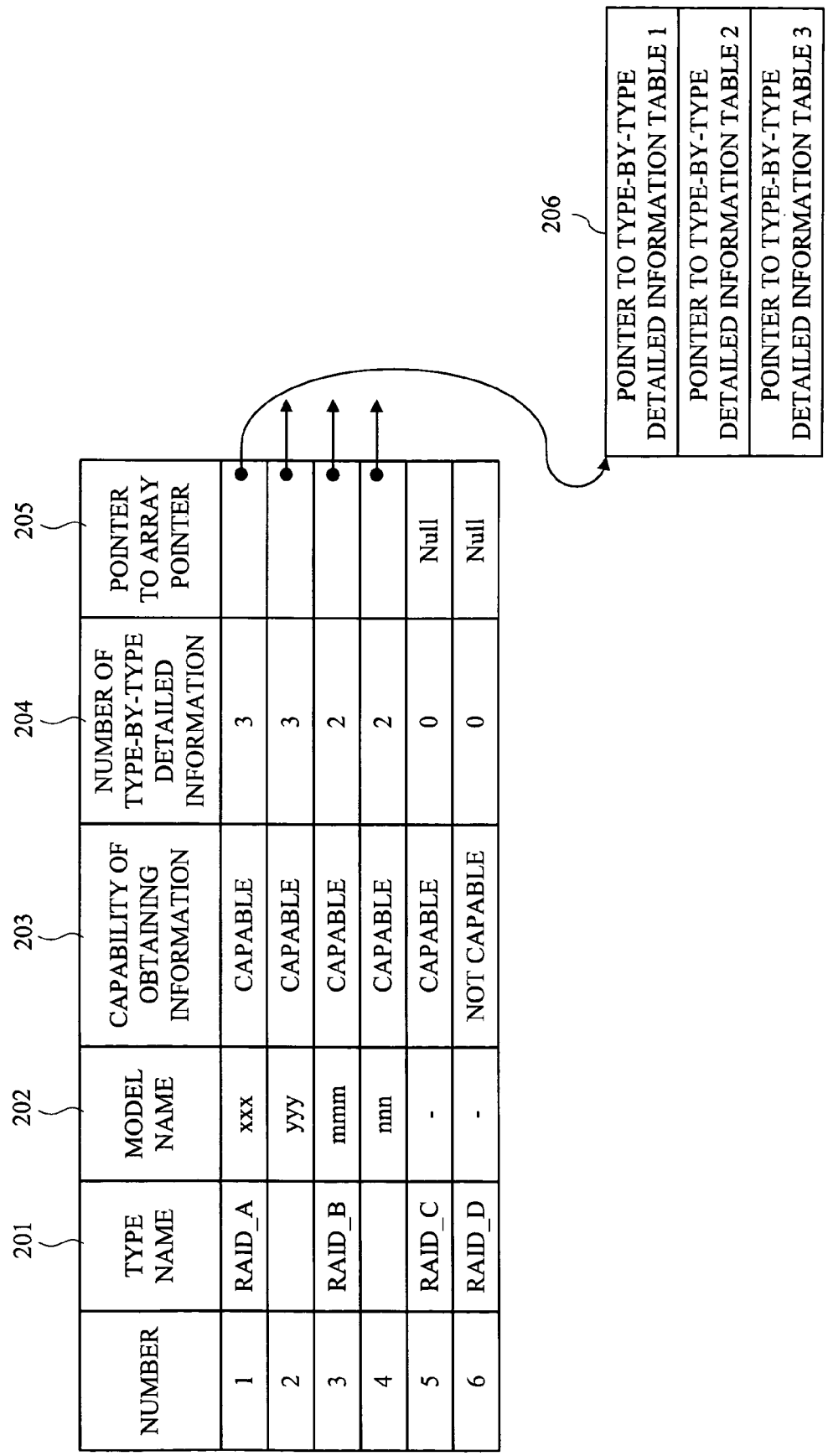
FIG. 2 is an illustrative drawing of a type-by-type information management table in the first embodiment of the present invention.

FIG. 2 is an illustrative drawing of the type-by-type information management table 131. The present invention is characterized in that various information outputted from the RAID management program 141 operating on the SVP 105 is acquired on the host computer 101 side to decide an LU migration method. The present invention is also characterized by using, if any, a matter that should be specifically taken into consideration in deciding such a method. Therefore, the type-by-type information management table 131 is used for managing information unique to each type of the disk array system 103.

A column 201 and a column 202 represent a type name and a model name, respectively. When different information should be retained for each type and model, rows represented by numbers are added. A column 203 retains a flag indicating the capability of obtaining information. As described above, since obtaining various information outputted from the RAID management program 141 operating on the SVP 105 is a significant characteristic in the present invention, the flag is used to indicate the capability. A column 204 represents the number of type-by-type detailed information. Since the present invention is characterized by using, if any, a matter that should be specifically taken in consideration when the LU migration method is determined, the number of such matters is retained as type-by-type detailed information. A column 205 retains a pointer to a pointer array 206 for accessing a table retained as type-by-type detailed information. With this, when an item with number 1 is taken as an example, if the type name and the model name are RAID_A and xxx, information from the SVP can be obtained, and three pieces of type-by-type detailed information are present.

Figures 12A, 12B:
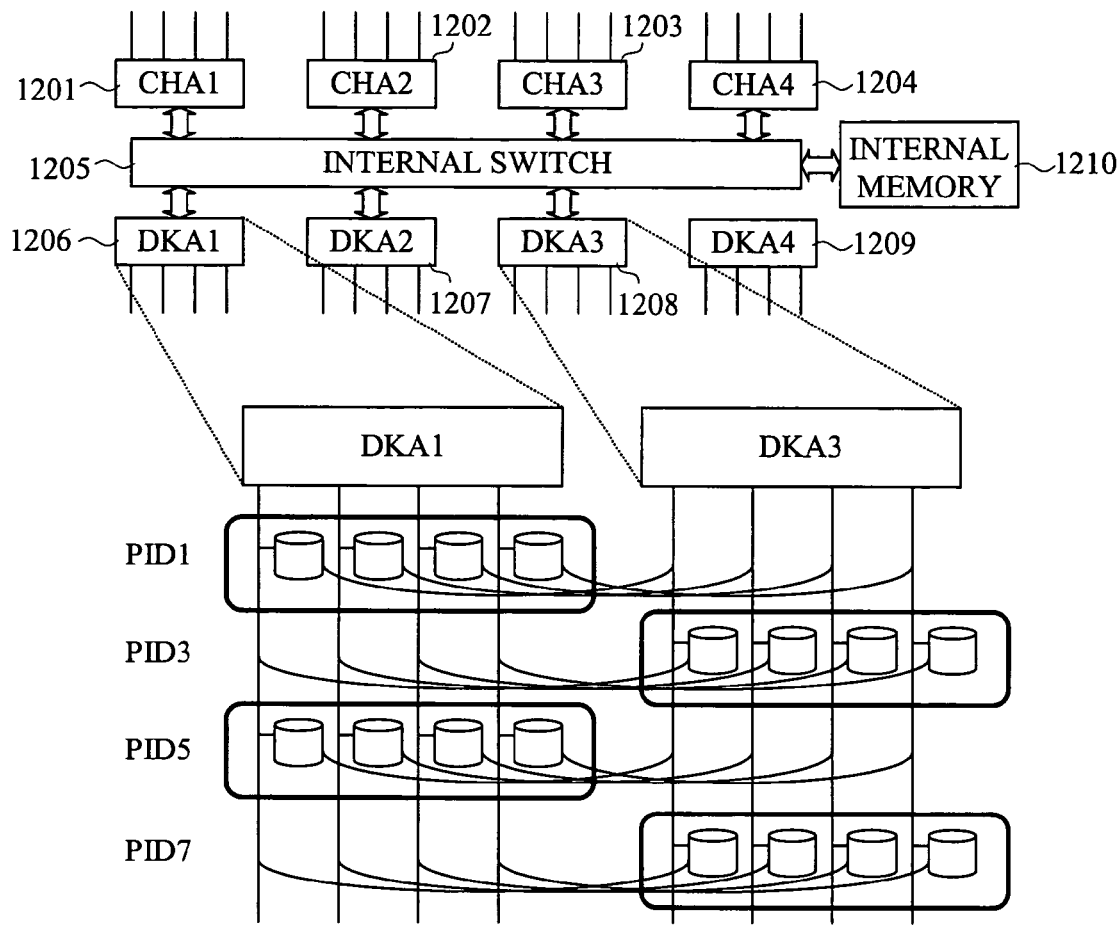
FIG. 12A is a drawing of the internal structure of a disk array system in the first embodiment of the present invention.
FIG. 12B is a drawing of a type-by-type detailed information table based on the internal structure shown in FIG. 12A.

The pointer array 206 retains pointers to type-by-type detailed information tables. An example of the type-by-type detailed information table is shown in FIG. 12A and FIG. 12B. FIG. 12A is a drawing of an exemplary internal structure of the disk array system, and FIG. 12B is a drawing of an exemplary type-by-type detailed information table based on the internal structure shown in FIG. 12A. The disk array system shown in this example includes channel adaptors (CHA) 1201 to 1204 for data transfer based on a request from the host computer, disk adaptors (DKA) 1206 to 1209 for data transfer to incorporated physical disk devices, an internal memory 1210 temporarily storing transfer data, and an internal switch 1205 for connection among CHAs, DKAs, and the internal memory. Data transfer between the host computer and the internal memory is controlled by the CHAs, and data transfer between the incorporated physical disk devices and the internal memory is controlled by the DKAs.

As for the incorporated physical disk devices, a DKA 1 has PGs with their PG IDs of PID1 and PID5 connected thereto, and PGs with their PG IDs of PID3 and PID7 are connected thereto. At this time, in the disk array system, the DKAs are made redundant for increasing the reliability, and PGs are shared between the DKA 1 and DKA 3. Also, although not shown, PGs are shared between the DKA 2 and DKA 4. In such a case, in the type-by-type detailed information table, a column 1212 is provided for describing PG IDs of PGs corresponding to the DKA IDs (column 1211). Such a type-by-type detailed information table is utilized when it is determined that usage of the DKAs is more distributed if another PG shared between DKA 2 and DKA 4 is selected instead of a PG shared between the DKA 1 and the DKA 3, for example, at the time of migration of an LU located in a PG with its ID of PGID1 to another PG.

FIG. 3 is an illustrative drawing of the individual information management table 132. The individual information management table 132 is provided with rows represented by numbers for the respective disk array systems 103 connected to the host computer 101 and is used for retaining a feature of each disk array system 103. For example, it copes with the case where the disk array systems are of the same type and model but with different options at the time of installation and therefore they differ in information obtained from the SVP 105.

A column 301 represents an individual ID. The individual ID is not particularly limited as long as it can uniquely identify the individual device, and information that can be obtained from the storage device such as vendor ID+product ID+product number is used for it. A column 302 retains a type and model of the individual device. With this, the type/model of each individual device is specified, and whether type-by-type detailed information is present is found with using the type-by-type information management table 131. A column 303 represents a method of accessing the SVP. With this, it is possible to cope with the case where the devices access different SVPs or the case where different interfaces are used for access. Examples of the accessing methods include an IP address in the operation LAN 104 and a Uniform Resource Locator (URL) when a World Wide Web (WWW) server interface is used. A column 304 represents a list of obtainable information. In the present invention, it is assumed that the RAID configuration information 142, the RAID statistical information 143, and the migration influence prediction information 144 are obtained. Of these information, if there is the information that cannot be obtained depending on the state of the individual device, such information is clearly identified in this column. A column 305 located last represents the capability of LU migration in the disk array system.

FIG. 4 is an illustrative drawing of the I/O access unified management table 133. In the I/O access unified management table 133, a correspondence is established among the file system configuration information 112 managed by the file system program 111, the logical volume configuration information 114 managed by the logical volume manager 113, and the RAID configuration information 142 and the RAID statistical information 143 obtained from the SVP 105. The I/O access unified management table 133 is used for determining a LU migration method based on the correspondence.

A column 401 represents a file system. A column 402 represents a logical volume (LV) on which a file system has been created. When the column 402 contains an LV but the column 401 does not contain a file system (represented by "–"), this means that the LV is present but no file system has been created on that LV. A column 403 represents an LU of which the LV in the column 402 is formed. When the column 403 contains an LU but the column 402 does not contain an LV (represented by "–"), this means that the LU is present but this LU does not form an LV. Note that a correspondence between the columns 401 and 402 is established by using the file system configuration information 112, which is not described in detail. Also, a correspondence between the columns 402 and 403 is established by using the logical volume configuration information 114, which is not described in detail.

A column 404 represents an individual ID, and a column 405 represents an LU ID. The LU ID is used to identify the LUs in the disk array system. With the columns 404 and 405, each LU can be identified even in the case where there are a plurality of host computers sharing a disk array system(s). If the columns 404 and 405 contains IDs but the column 403 does not contain any LU, this means that the LU is not published to the host computer, that is, it corresponds to the case where the LU is reserved in the disk array system.

A column 406 contains examples of the RAID statistical information 143 obtained from the SVP 105. In the present embodiment, by using the utilization ratio of the LUs, the average value and the maximum value are retained. However, the RAID statistical information for use in the present invention is not limited to the utilization ratio of the LUs. Other values useable as statistical information such as those described in the above-described non-patent document 4, for example, an I/O transfer rate and the number of read/write executions can also be used as long as they represent statistical information that can be collected by the SVP.

A column 407 contains examples of the RAID configuration information 142 obtained from the SVP 105. Here, the capacity of the LU, an ID of the parity group (PG), a RAID level of the PG, and the configuration of the physical storage devices of the PG are retained.

Figure 5:
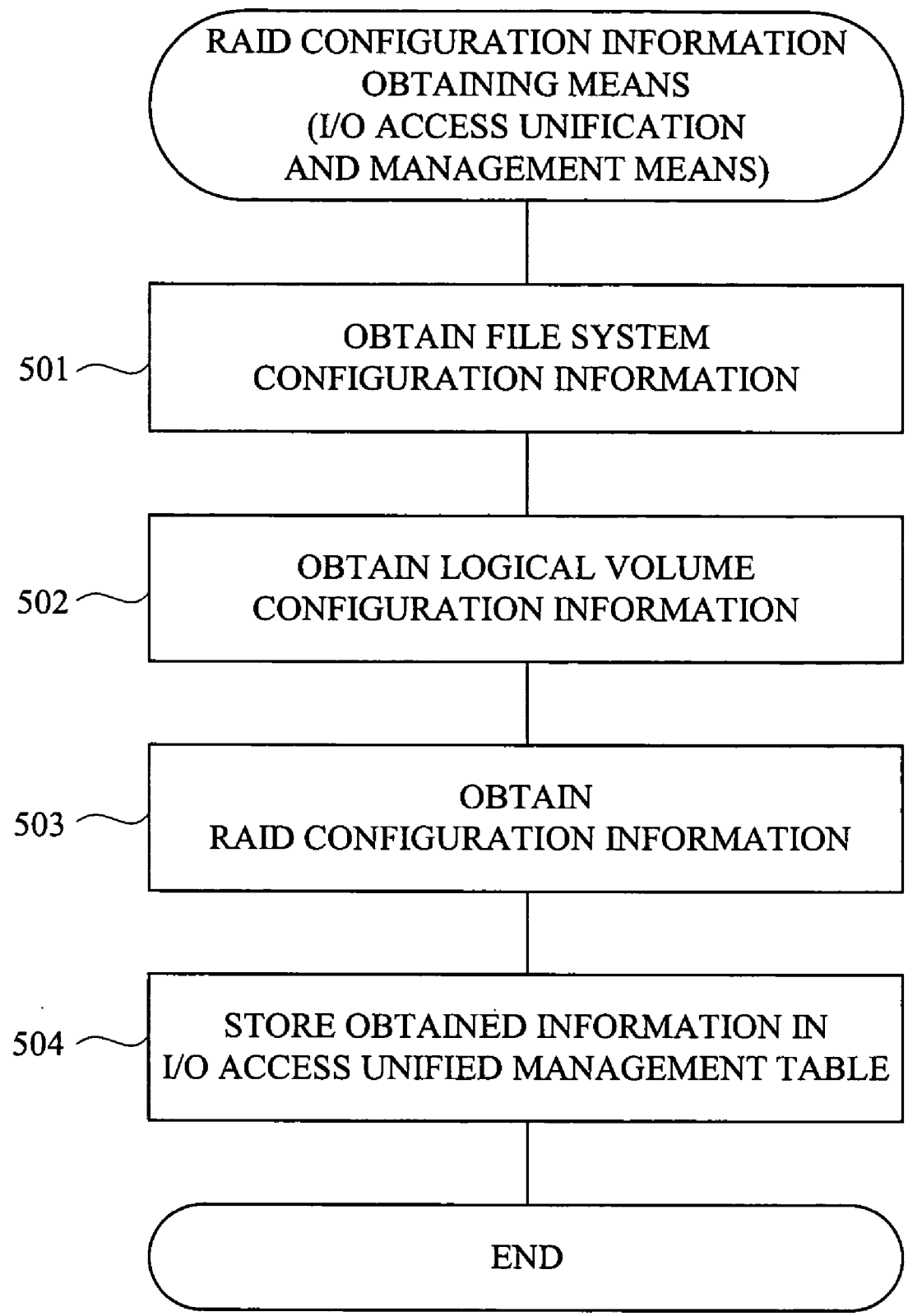
FIG. 5 is a flowchart showing a process of RAID configuration information obtaining means in I/O access unification and management means in the first embodiment of the present invention.
Figure 6:
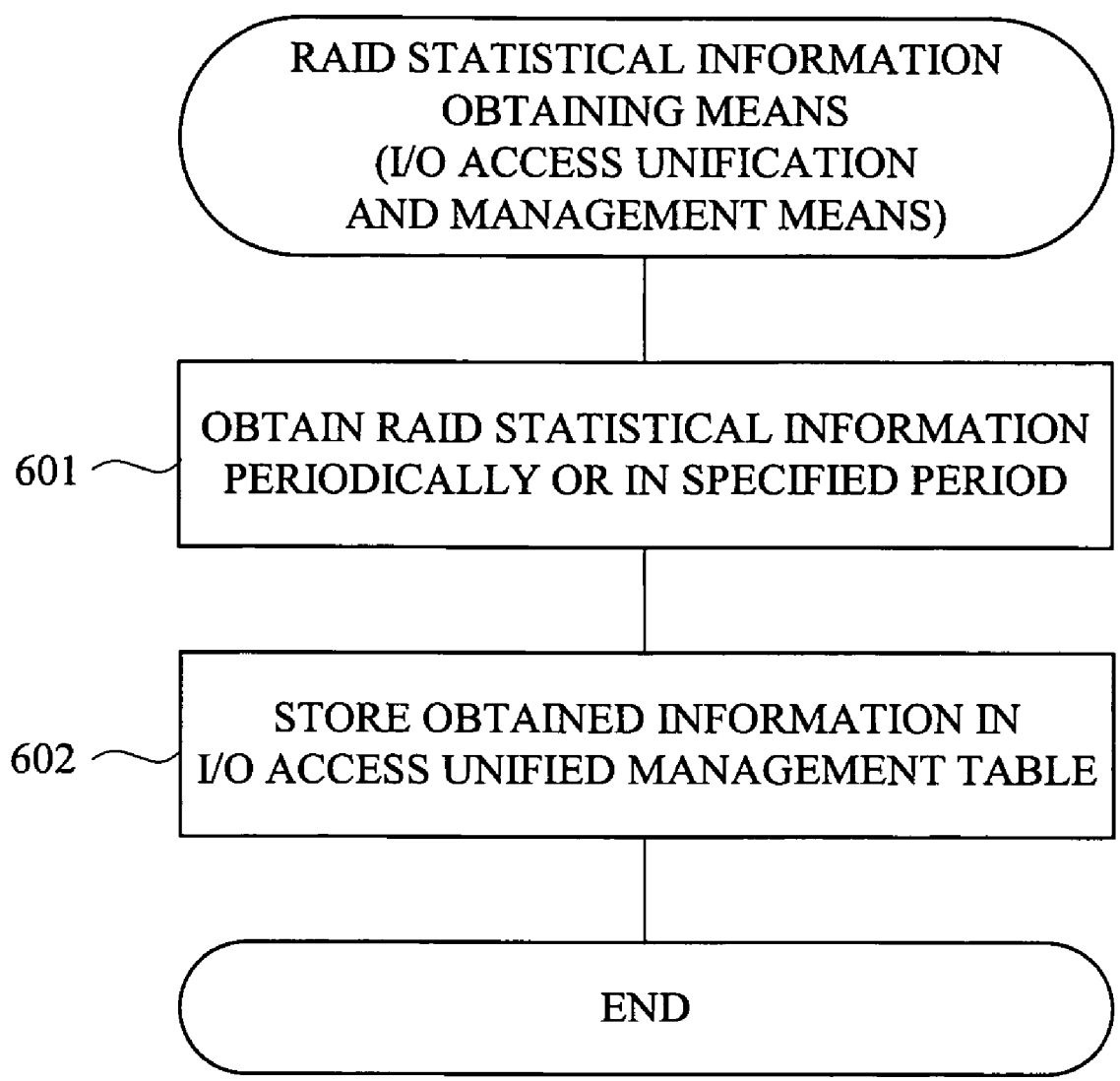
FIG. 6 is a flowchart showing a process of RAID statistical information obtaining means in the I/O access unification and management means in the first embodiment of the present invention.

FIG. 5 and FIG. 6 depict flowcharts of processes of the I/O access unification and management means 121 according to the present embodiment. The I/O access unification and management means 121 includes RAID configuration information obtaining means and RAID statistical information obtaining means, and their flowcharts are shown in FIG. 5 and FIG. 6, respectively.

The RAID configuration information obtaining means follows the flowchart shown in FIG. 5 in which a correspondence between the column 401 and the column 402, a correspondence between the column 402 and the column 403, and the configuration information for each LU are obtained from the I/O access unified management table 133. In step 501, the file system configuration information 112 managed by the file system program 111 is obtained. More specifically, this information can be obtained by obtaining mount information. In step 502, the logical volume configuration information 114 managed by the logical volume manager 113 is obtained. This information can be obtained through an interface provided by the logical volume manager 113 for reading a status area and a descriptor area in the logical volume. In step 503, the RAID configuration information 142 is obtained from the SVP 105. At this time, it is determined with the obtainable information (304) in the individual information management table 132 whether the RAID configuration information is obtainable. If obtainable, the means indicated by the method of access to the SVP (303) is used to request the SVP for the RAID configuration information. Finally in step S504, the information obtained in steps 501 to 503 is stored in the I/O access unified management table 133.

The RAID statistical information obtaining means follows the flowchart shown in FIG. 6 in which the information in the column 406 in the I/O access unified management table 133 is obtained. In step 601, the RAID statistical information 143 is obtained from the SVP 105. The RAID management program 141 periodically obtains this RAID statistical information 143 and stores the information in a predetermined period in the disk device 106. In this step, the latest information may be periodically obtained, or previous information in the period specified by a manager of the host computer 101 may be obtained. Finally in step 602, the information obtained in step 601 is stored in the I/O access unified management table 133.

Figure 7:
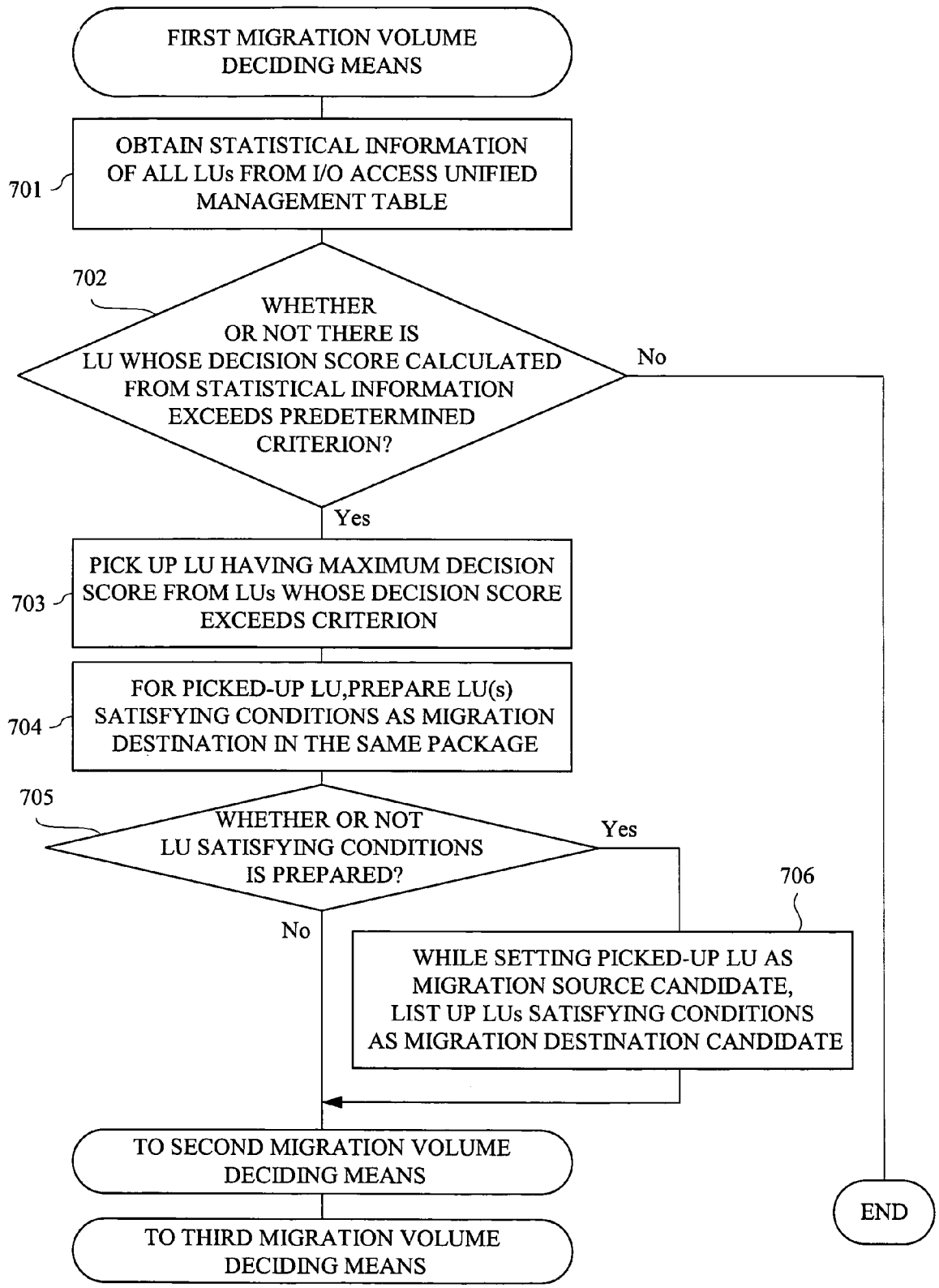
FIG. 7 is a flowchart showing a process of first migration volume deciding means in the first embodiment of the present invention.
Figure 8:
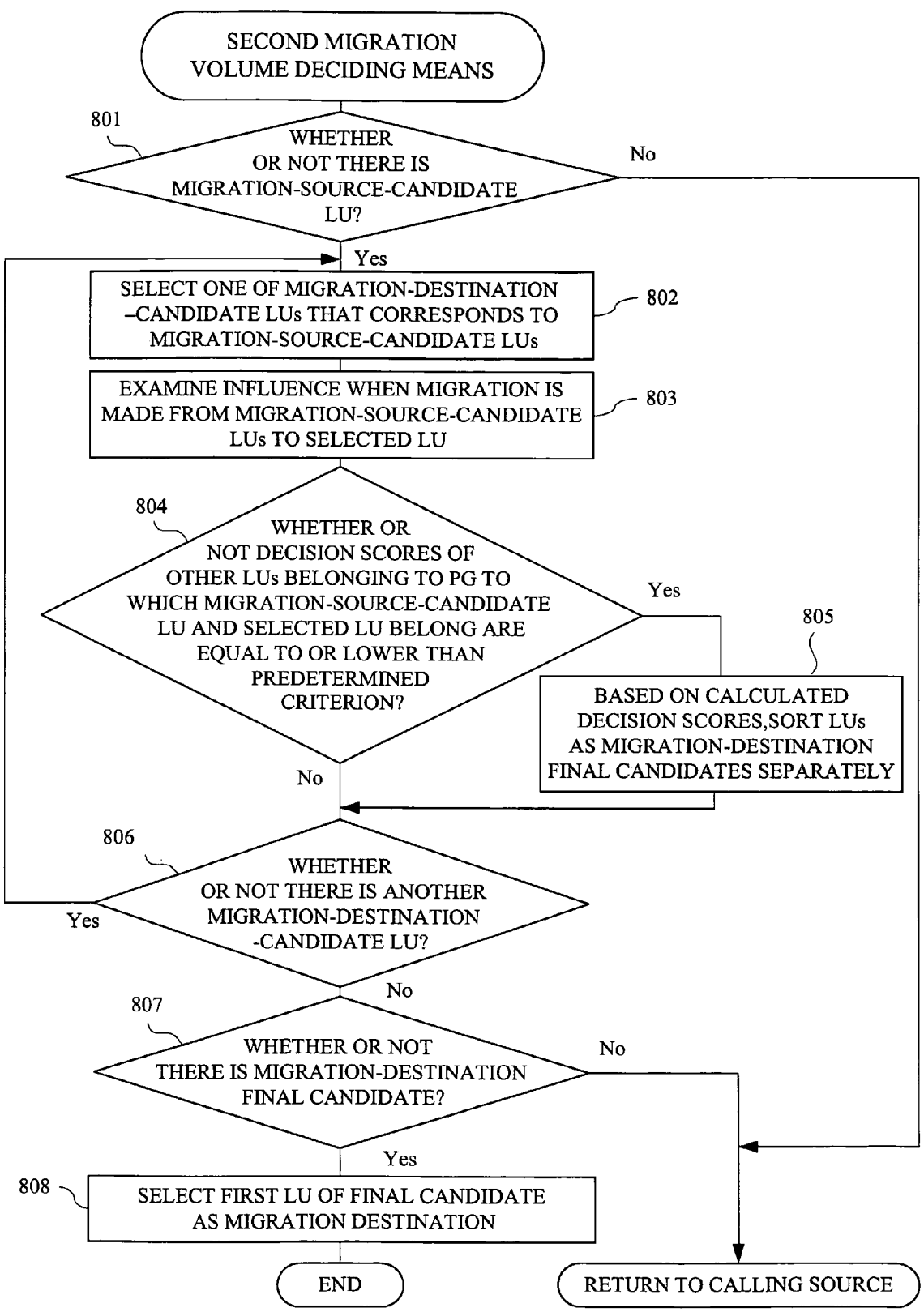
FIG. 8 is a flowchart showing a process of second migration volume deciding means in the first embodiment of the present invention.
Figure 9:
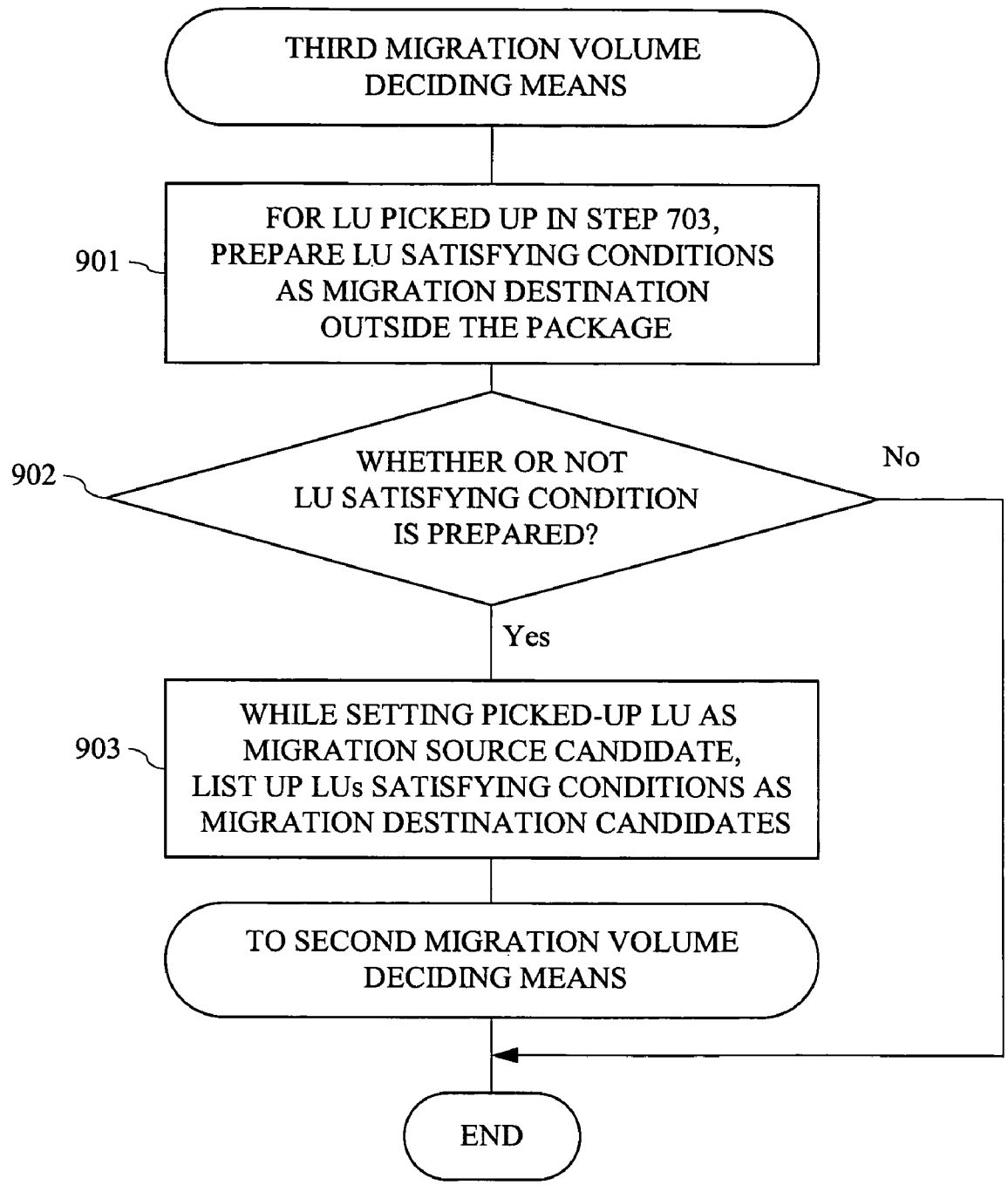
FIG. 9 is a flowchart showing a process of third migration volume deciding means in the first embodiment of the present invention.

FIG. 7 to FIG. 9 are flowcharts of the migration volume determining means according to the present embodiment, and are sequentially described below.

In step 701 of FIG. 7, all statistical information retained in the I/O access unified management table 133 is obtained. The statistical information for use in the present embodiment is the utilization ratio of the LUs. Hereinafter, description will be made with using the utilization ratio as an example.

In step 702, it is determined whether a utilization ratio exceeds a predetermined criterion. As the predetermined criterion, using a threshold of the average utilization ratio or the maximum utilization ratio is the simplest way. In the present embodiment, when the value of the utilization ratio exceeds the predetermined threshold, the difference is used as a decision score. However, the calculation method of the threshold and the decision score is not particularly limited to the above as long as it is the criterion appropriate to other values available as the RAID statistical information.

In step 702, if there is no LU exceeding the criterion, since there is no need to decide a migration volume, the process ends. If there is an LU exceeding the criterion, the procedure goes to step 703. In step 703, an LU for migration is first picked up. In the present embodiment, an LU having a maximum decision score in step 702 is simply picked up. However, how to select may depend on a decision by the system administrator. In this case, LUs exceeding the criterion are presented as candidates to the system administrator, and then an LU specified by the system administrator is picked up.

In step 704, for the LU picked up in step 703, an LU satisfying conditions as a migration destination in the same package is prepared. In the present embodiment, the LU satisfying conditions as a migration destination is the one having the same capacity as that of the picked-up LU. Here, the number of LUs prepared is not necessarily one, but may be plural as long as they satisfy the conditions.

In step 705, if one or more LUs satisfying the conditions as the migration destination have been prepared, the picked-up LU is handled as a migration-source candidate and the LUs satisfying the conditions are listed up as migration-destination candidates in the following step (step 706).

Next, the procedure goes to step 801 of FIG. 8. In step 801, it is determined whether an LU(s) as a migration-source candidate is present. If an LU(s) satisfying the conditions as a migration destination has been prepared in the above-described step 706, the LU(s) is supposed to be handled as a migration-source candidate, and therefore the procedure goes to step 802. If not prepared, this means that no LU allowing migration is present in the package. Therefore, in order to find an LU allowing migration outside the package, the procedure goes to step 901 of FIG. 9.

In the processes of step 802 and thereafter, an influence when migration is made to each migration-destination candidate is evaluated to determine a migration destination. In step 802, one of the migration-destination candidates is selected. In step 803, an influence when migration is made from the migration-source-candidate LUs to one of the migration-destination-candidate LUs selected in step 802 is examined. How to examine the influence is described later with reference to FIG. 10.

Next, in step 804, whether or not migration is performed is determined based on the examination results in step 803. When the LU migration is performed, in terms of the configuration of the physical storage devices, migration should be made to a PG different from the PG to which the source LU belongs. Therefore, migration is to be made to an LU belonging to a PG different from the source PG. At this time, the migration-destination PG has an LU that is not related to the migration-source LU and the unrelated LU may be used for another operation. Therefore, in addition to evaluation of other LUs in the PG to which the migration-source LU belongs, evaluation of other LUs in the PG to which the migration-destination LU belongs is required. In this evaluation, a method similar to the method of calculating the decision score used in step 702 is used. As a result of this evaluation, if an influence on the other LUs in the PG to which the migration-destination LU belongs is equal to or smaller than a predetermined criterion, it can be determined that migration poses no problem. If it is determined that migration poses no problem, the procedure goes to step 805. In step 805, in order to select a more preferable migration-destination LU, based on the decision score used in step 804, the evaluated LUs are sorted and stored as migration-destination final candidates.

In step 806, if any other migration-destination candidate is present, evaluation similar to that shown in steps 802 to 804 is performed. Then, in steps 807 and 808, if migration-destination final candidates are present in a state where no other migration-destination candidate is present, the head element of the migration-destination final candidates sorted in step 805 is selected as a migration destination. If migration-destination final candidates are not present at this moment, the procedure returns to the calling procedure.

FIG. 9 shows a process to be performed when an appropriate migration destination cannot be found in the same package. In step 901, for the LU picked up in step 703 of FIG. 7, an LU(s) satisfying conditions as a migration destination is prepared outside the package.

In step 902, if one or more LUs satisfying conditions as migration destinations have been prepared, the picked-up LU is handled as a migration-source candidate and the LUs satisfying the conditions are listed up as migration-destination candidates in the following step (step 903). After listing up, each step of FIG. 8 is performed. If no LU satisfying the conditions is prepared in step 902, no appropriate migration destination is present, and therefore the process ends.

With the steps shown in FIG. 7 to FIG. 9 described above, an LU as the migration destination is decided.

Figure 10:
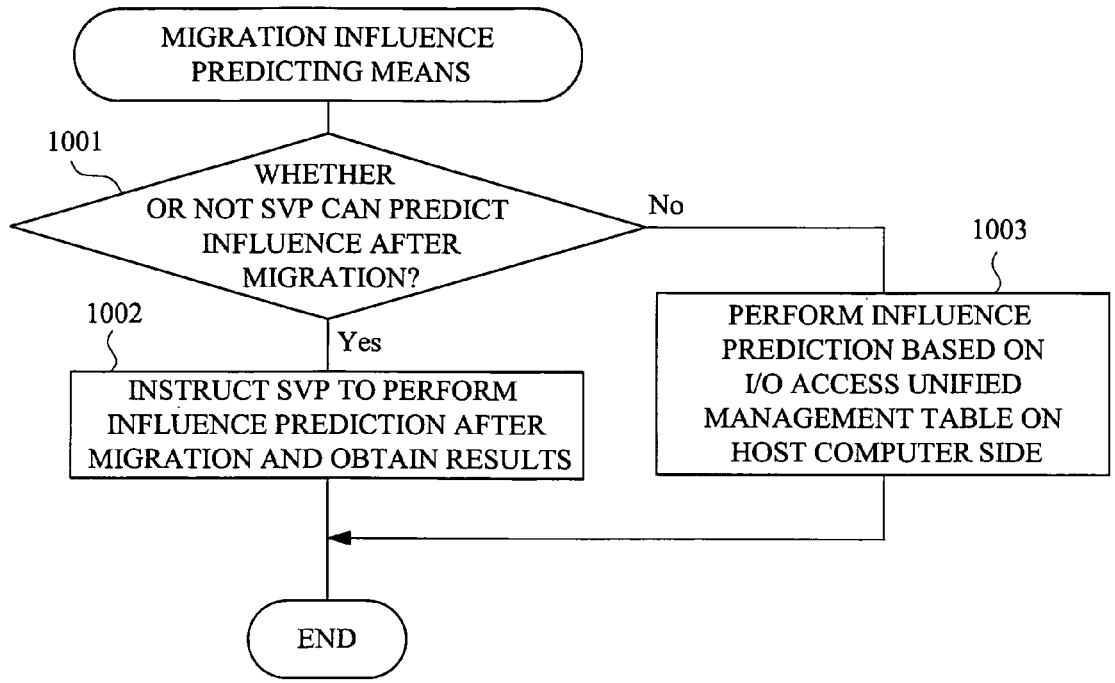
FIG. 10 is a flowchart showing a process of migration influence predicting means in the first embodiment of the present invention.

Next, the migration influence predicting means 123 operating in step 803 will be described. FIG. 10 is a flowchart of a process of the migration influence predicting means 123.

In step 1001, whether the SVP 105 can predict an influence after migration is decided. This decision is made in view of whether the migration-destination-candidate LU is in the same package and whether the individual information management table 132 of FIG. 3 describes that the influence prediction information is obtainable. If it is decided that the SVP can predict such an influence, the procedure goes to step 1002, and the SVP is instructed to predict an influence after migration, and then the result is obtained. In the present embodiment, this influence prediction is performed on the basis of the utilization ratio of the LUs.

If it is determined that the SVP 105 cannot predict such an influence, prediction is performed on the host computer 101 side by using the I/O access unified management table 133 (step 1003). In the simplest way, this prediction is performed assuming that the utilization ratio of the LUs is changed in inversely proportional to the number of constituent physical storage devices in the PGs of the migration source and the migration destination. A more sophisticated predicting method may be used, but the present invention does not consider the method.

Figure 11:
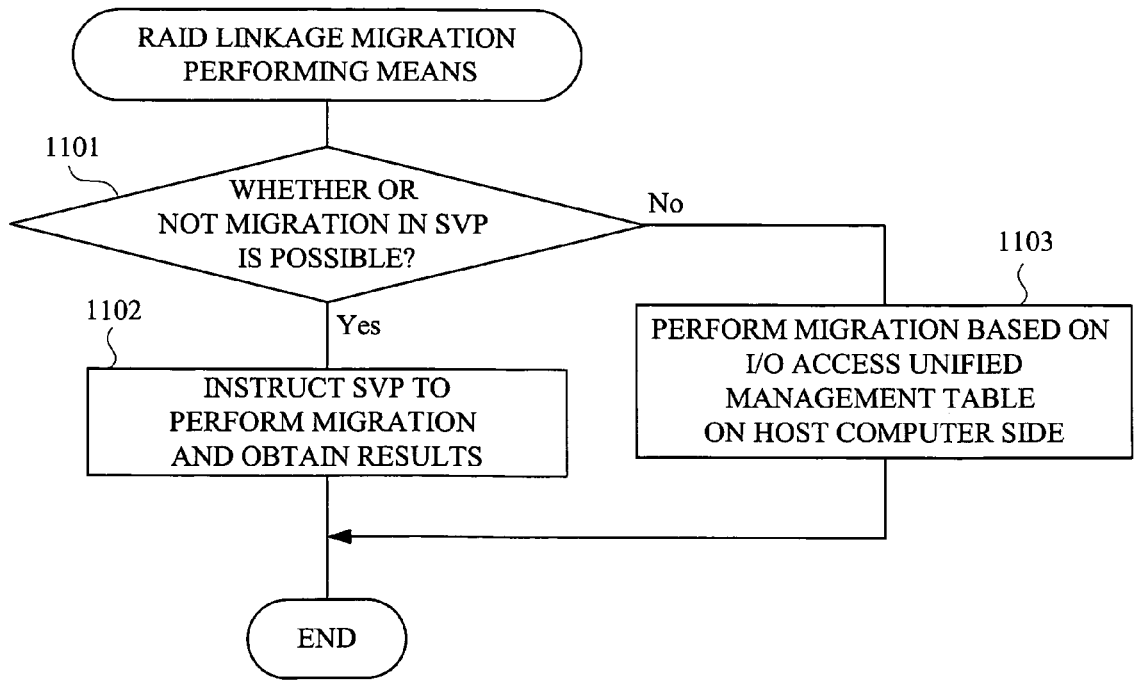
FIG. 11 is a flowchart showing a process of RAID linkage migration performing means in the first embodiment of the present invention.

FIG. 11 is a flowchart of a process of the RAID linkage migration performing means 124, which is the last one in the present embodiment. In brief, in this process, if possible, LU migration is performed in the disk array system 103, and if not possible, the migration is performed on the host computer 101 side.

In step 1101, it is decided whether the SVP 105 can instruct the disk array system 103 to perform the migration using the migration-source LU and the migration-destination LU decided by the migration volume deciding means 122. This decision is made in view of whether the migration-destination candidate LU is in the same package and whether the individual information management table 132 of FIG. 3 describes that LU migration can be performed. If it is decided that migration is possible, the procedure goes to step 1102, and the SVP 105 is instructed to perform migration, and then the results are obtained. If it is decided that migration is not possible, migration is performed on the host computer 101 side based on the I/O access unified management table 133 (step 1103). More specifically, data copying is performed.

As described above, according to the present embodiment, in the host computer 101, LU migration in terms of the file system and the logical volume can be performed based on the file system configuration information 112 and the logical volume configuration information 114 managed by the host computer side and the I/O access unified management table 133 created from the RAID configuration information 142 and the RAID statistical information 143 obtained from the SVP 105 connected to the disk array system 103. Also, since the migration method is determined based on the migration influence prediction information 144 with high accuracy obtained from the SVP 105, the effective migration is possible.

Second Embodiment

Figure 13:
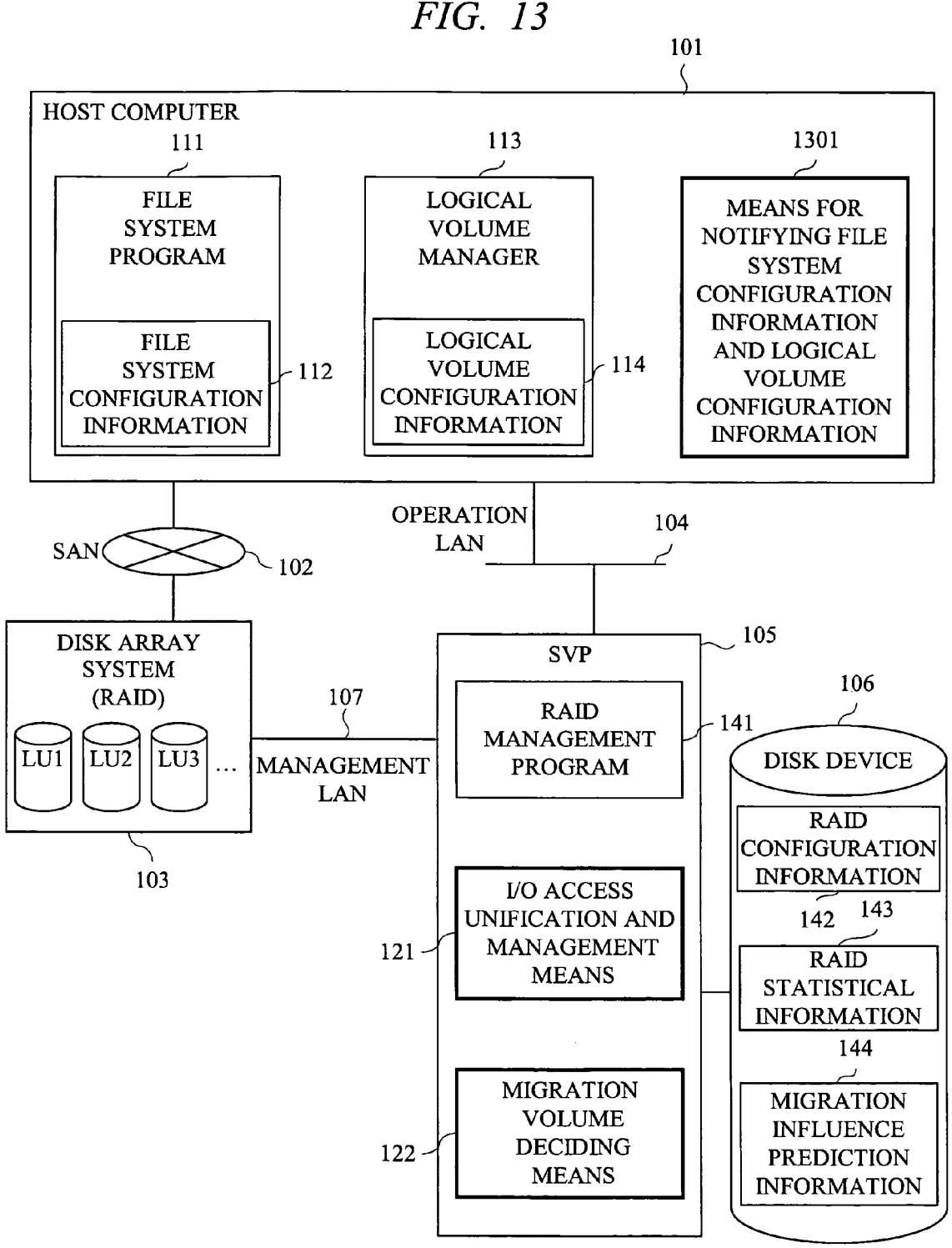
FIG. 13 is a schematic drawing of the configuration of a computer system according to a second embodiment of the present invention.

FIG. 13 is a schematic drawing of the configuration of a computer system according to a second embodiment of the present invention. In the above-described first embodiment, the RAID configuration information 142 managed by the SVP 105 and other information are used on the host computer 101 side. Therefore, the I/O access unified management table 133 is retained on the host computer side and used in the LU migration. In contrast to the above-described first embodiment, in the present embodiment, the file system configuration information 112 managed by the file system program 111 and the logical volume configuration information 114 managed by the logical volume manager 113 in the host computer 101 are used in the SVP 105. By doing so, effects similar to those in the above-described first embodiment can be achieved.

Hereinafter, the present embodiment will be described by showing the differences from the above-described first embodiment.

In the present embodiment, the I/O access unification and management means 121 and the migration volume deciding means 122 included in the host computer 101 in the above-described first embodiment are included in a program in the SVP 105. Furthermore, in order to notify the file system configuration information 112 managed by the file system program 111 and the logical volume configuration information 114 managed by the logical volume manager 113 to the SVP 105 side, means 1301 of notifying the file system configuration information and logical volume configuration information is added to the program on the host computer side.

Therefore, according to the present embodiment, LU migration in terms of the file system and the logical volume can be performed in the SVP 105 based on the file system configuration information 112 and the logical volume configuration information 114 managed on the host computer 101 side and the I/O access unified management table created from the RAID configuration information 142 and the RAID statistical information 143 obtained from the SVP 105 connected to the disk array system 103.

Third Embodiment

Figure 14:
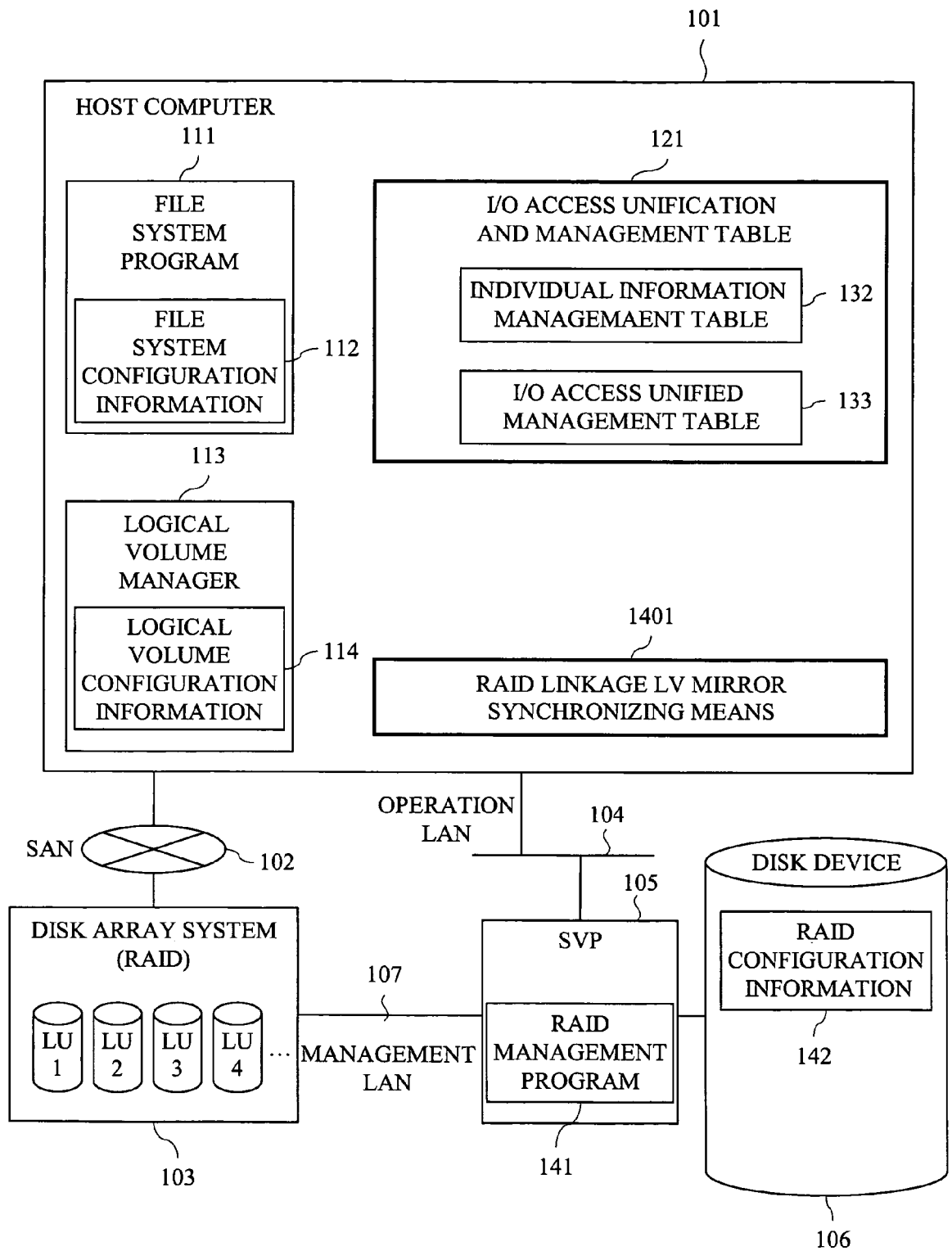
FIG. 14 is a schematic drawing of the configuration of a computer system according to a third embodiment of the present invention.

FIG. 14 is a schematic drawing of the configuration of a computer system according to a third embodiment of the present invention. A difference between the present embodiment and the above-described first and second embodiments is that LU migration is performed in the first and second embodiments while LU copying is performed in the present embodiment. In the present embodiment, the copied LU is used to form a logical volume as a mirror volume by establishing the correspondence between the copy-source LU and a copy-destination LU in the logical volume manager 113 on the host computer 101 side.

Hereinafter, the present embodiment will be described by mainly showing the differences from the above-described first embodiment.

Since an object of the present embodiment is to perform copying in units of LU, the migration volume deciding means 122 and the migration influence predicting means 123 in the above-described first embodiment are not required. Accordingly, the RAID statistical information 143 and the migration influence prediction information 144 managed by the SVP 105 are not used. Also, unlike the case of the migration volume deciding means 122 in the above-described first embodiment, it is not assumed that an LU as a copy destination is automatically decided. In LU copying in the present embodiment, it is assumed that the system administrator specifies a copy destination LU when forming a logical volume as a mirror volume. Therefore, the type-by-type information management table 131 is not required, either. Furthermore, the column 406 for the utilization ratio and the column 407 for the LU configuration information in the I/O access unified management table 133 described in the above-described first embodiment are not required, and they are used only for establishing a correspondence between the LV and the LU. Note that, although not shown, a column indicating whether LU copying can be performed is required to be included in the individual information management table 132.

A process newly added in the present embodiment is performed by RAID linkage LV mirror synchronizing means 1401. Conventionally, in order to form a mirror of a logical volume, LU copying is performed in the host computer. The present embodiment is characterized in that, with the RAID linkage LV mirror synchronizing means 1401, the LU copying is performed in the SVP 105, if possible.

Figure 15:
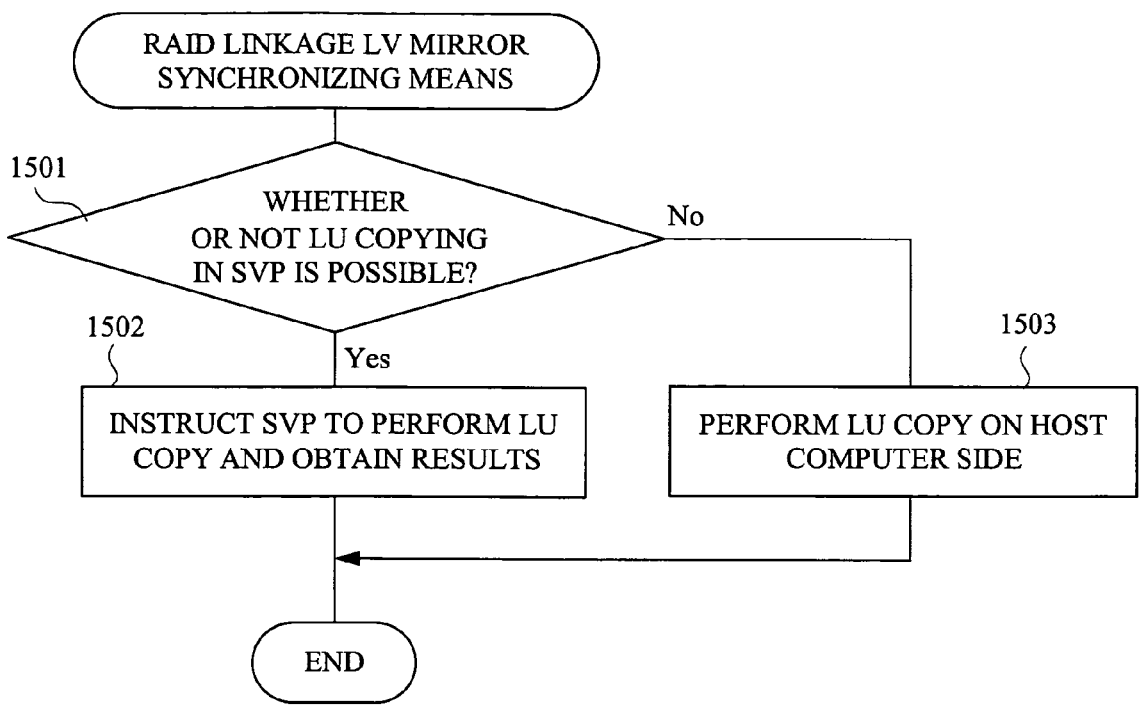
FIG. 15 is a flowchart showing a process of RAID linkage LV mirror synchronizing means in the third embodiment of the present invention.

FIG. 15 is a flowchart of a process of the RAID linkage LV mirror synchronizing means 1401. In step 1501, it is decided whether the SVP 105 can instruct the disk array system 103 to perform the migration using the copy-source LU and the copy-destination LU. This decision is made in view of whether the individual information management table 132 describes that LU copying can be performed. If it is decided that copying is possible, the procedure goes to step 1502, and the SVP is instructed to perform copying, and then the results are obtained. If it is decided that copying is not possible, copying is performed on the host computer side as before (step 1503).

Therefore, according to the present embodiment, LU copying, which is conventionally performed on the host computer 101 side, can be performed in the SVP 105 if possible. Therefore, it is possible to efficiently configure a logical volume mirror.

In the foregoing, the invention made by the inventors of the present invention has been concretely described based on the embodiments. However, it is needless to say that the present invention is not limited to the foregoing embodiments and various modifications and alterations can be made within the scope of the present invention.

The present invention relates to a computer system which provides a file system and a logical volume. More particularly, it relates to a technology effectively applied to a file system management method and program for changing the configuration of the file system.

What is claimed is:

1. A computer system formed of one or more computers and one or more physical volumes, the system comprising:
   first means which unifies said physical volumes and manages the unified physical volumes as a logical volume;
   second means which obtains configuration information of physical storage devices forming said physical volumes;
   third means which obtains performance statistical information collected in said physical volumes; and
   a table which relates said logical volume and the performance statistical information collected in said physical volumes.

2. The computer system according to claim 1,
   wherein said table has a threshold for first information included in said performance statistical information, and
   wherein said computer system further comprises:
   fourth means which decides whether the physical volume used as said logical volume is changed from a first physical volume unified into said logical volume to a second physical volume not unified into said logical volume when said first information exceeds said threshold.

3. A data management method in a computer system formed of one or more computers and one or more physical volumes, the method comprising:
   a first step of unifying said physical volumes and managing the unified physical volumes as a logical volume;

a second step of obtaining configuration information of physical storage devices forming said physical volumes;

a third step of obtaining performance statistical information collected in said physical volumes and relating said logical volume and the performance statistical information collected in said physical volumes to a table; and a fourth step of deciding whether the physical volumes used as said logical volume is changed from a first physical volume unified into said logical volume to a second physical volume not unified into said logical volume when first information included in said performance statistical information exceeds a threshold.

4. The data management method according to claim 3, wherein said first information is a utilization ratio of said physical volumes.

5. The data management method according to claim 4, wherein, in said fourth step, at the time of a decision whether a change from said first physical volume to said second physical volume is made, a predicted value of said utilization ratio after the change is calculated, and the decision is made based on the calculated predicted value.

6. The data management method according to claim 5, wherein, in the case where there are a plurality of candidates, each usable as said second physical volumes, the predicted value of said utilization ratio is calculated assuming that each of the candidates is used as the second physical volume, and one of the second physical volumes is selected by comparing the calculated predicted values with each other.

7. The data management method according to claim 6, wherein, when the predicted value of said utilization ratio is calculated, a predicted value calculated by a computer for managing the physical volumes which is communicable with each of the physical volumes is used.

8. A program tangibly embodied on a computer-readable storage medium, wherein the program causes one or more computers in a computer system to execute steps of a data management method, wherein said computer system comprises said one or more computers and one or more physical volumes, the program causing said one or more computers to execute:

a first step of unifying said physical volumes and managing the unified physical volumes as a logical volume;

a second step of obtaining configuration information of physical storage devices forming said physical volumes;

a third step of obtaining performance statistical information collected in said physical volumes and relating said logical volume and the performance statistical information collected in said physical volumes to a table; and a fourth step of deciding whether the physical volume used as said logical volume is changed from a first physical volume unified into said logical volume to a second physical volume not unified into said logical volume when first information included in said performance statistical information exceeds a threshold.

9. A computer system formed of one or more computers, one or more physical volumes, and a computer for managing the physical volumes which is communicable with said physical volumes, the system comprising:

first means which unifies said physical volumes and manages the unified physical volumes as a logical volume; and second means which obtains configuration information of physical storage devices forming said physical volumes, wherein said computer for managing the physical volumes includes third means which obtains performance statistical information of said physical volumes and a table which relates said logical volume and the performance statistical information of said physical volumes.

10. The computer system according to claim 9, wherein said table has a threshold for first information included in said performance statistical information, and said computer system further comprises: fourth means which decides whether the physical volume used as said logical volume is changed from a first physical volume unified into said logical volume to a second secondary storage physical volume not unified into said logical volume when said first information exceeds said threshold.

11. A data management method in a computer system formed of one or more computers, one or more physical volumes, and a computer for managing the physical volumes which is communicable with said physical volumes, the method comprising:

a first step of unifying said physical volumes and managing the unified physical volumes as a logical volume;

a second step of obtaining configuration information of physical storage devices forming said physical volumes;

a third step, performed by said computer for managing the physical volumes, of obtaining performance statistical information of the secondary storages and relating said logical volume and the performance statistical information of said physical volumes to a table; and a fourth step, performed by said computer for managing the physical volumes, of deciding whether a physical volume used as said logical volume is changed from a first physical volume unified into said logical volume to a second physical volume not unified into said logical volume when first information included in said performance statistical information exceeds a threshold.

12. The data management method according to claim 11, wherein said first information is a utilization ratio of said physical volumes.

13. The data management method according to claim 12, wherein, in said fourth step, at the time of a decision whether a change from said first physical volume to said second physical volume is made, a predicted value of said utilization ratio after the change is calculated, and the decision is made based on the calculated predicted value.

14. The data management method according to claim 13, wherein, in the case where there are a plurality of candidates, each usable as said second physical volume, the predicted value of said utilization ratio is calculated assuming that each of the candidates is used as the second physical volume, and one of the second physical volumes is selected by comparing the calculated predicted values with each other.

15. A program tangibly embodied on a computer-readable storage medium, wherein the program causes one or more computers in a computer system to execute steps of a data management methods, wherein said computer system comprises said one or more computers, one or more physical volumes, and a computer for managing the physical volumes and which is communicable with said physical volumes, the program causing said one or more computers to execute;

a first step of unifying said physical volumes and managing the unified physical volumes as a logical volume;

a second step of obtaining configuration information of physical storage devices forming said physical volumes;

a third step, performed by said computer for managing the physical volumes, of obtaining performance statistical information of said physical volumes and relating said logical volume and the performance statistical information of said physical volumes to a table; and a fourth step, performed by said computer for managing the physical volumes, of deciding whether the physical volumes used as said logical volume is changed from a first physical volume unified into said logical volume to a second physical volume not unified into said logical volume when first information included in said performance statistical information exceeds a threshold.

16. A computer system formed of one or more computers, one or more physical volumes, and a computer for managing the physical volumes which is communicable with said physical volumes, the system comprising:

first means which unifies said physical volumes and manages the unified physical volumes as a logical volume; and in the case where a mirror in which a first physical volume and a second physical volume have same contents can be formed as said logical volume and said physical volumes and said computer for managing the physical volumes have a function of data copying among the physical volumes, second means which decides, by using a table which relates said logical volume and said physical volumes, whether said function of data copying among the physical volumes can be used for synchronization of the contents of said first and second physical volumes to form the mirror between said first and second physical volumes.

17. The computer system according to claim 16, further comprising: third means which instructs said physical volumes and said computer for managing the physical volumes to perform said function of data copying among the physical volumes when it is decided that said function of data copying among the physical volumes can be used for synchronization of the contents of said first and second physical volumes.

18. A data management method in a computer system formed of one or more computers, one or more physical volumes, and a computer for managing the physical volumes which is communicable with said physical volumes, the method comprising:

a first step of unifying said physical volumes and managing the unified physical volumes as logical volume; and in the case where a mirror in which a first physical volume and a second physical volume have same contents can be formed as said logical volume and said physical volumes and said computer for managing the physical volumes have a function of data copying among the physical volumes, a second step of deciding, by using a table which relates said logical volume and said physical volumes, whether said function of data copying among the physical volumes can be used for synchronization of the contents of said first and second physical volumes to form the mirror between said first and second physical volumes.

19. The data management method according to claim 18, further comprising: a third step of instructing said physical volumes and said computer for managing the physical volumes to perform said function of data copying among the physical volumes when it is decided that said function of data copying among the physical volumes can be used for synchronization of the contents of said first and second physical volumes.

20. A program tangibly embodied on a computer-readable storage medium, wherein the program causes one or more computers in a computer system to execute steps of a data management method, wherein said computer system comprises said one or more computers, one or more physical volumes, and a computer for managing the physical volumes and which is communicable with said physical volumes, the program causing said one or more computers to execute:

a first step of unifying said physical volumes and managing the unified physical volumes as a logical volume; and in the case where a mirror in which a first physical volume and a second physical volume have same contents can be formed as said logical volume and the physical volumes and said computer for managing the physical volumes have a function of data copying among the physical volumes, a second step of deciding, by using a table which relates said logical volume and said physical volumes, whether said function of data copying among the physical volumes can be used for synchronization of the contents of said first and second physical volumes to form the mirror between said first and second physical volumes.

* * * * *